US010604922B2

(12) United States Patent
Guha

(10) Patent No.: US 10,604,922 B2
(45) Date of Patent: *Mar. 31, 2020

(54) VOLUME CONTROLLABLE TOILET FLUSH SYSTEMS AND METHODS OF USE

(71) Applicant: Etash Kumar Guha, Florence, SC (US)

(72) Inventor: Etash Kumar Guha, Florence, SC (US)

(*) Notice: Subject to any disclaimer, the term of this patent is extended or adjusted under 35 U.S.C. 154(b) by 20 days.

This patent is subject to a terminal disclaimer.

(21) Appl. No.: 16/023,086

(22) Filed: Jun. 29, 2018

(65) Prior Publication Data
US 2018/0305912 A1 Oct. 25, 2018

Related U.S. Application Data

(62) Division of application No. 15/682,749, filed on Aug. 22, 2017, now Pat. No. 10,036,152.

(60) Provisional application No. 62/377,937, filed on Aug. 22, 2016.

(51) Int. Cl.
*E03D 1/14* (2006.01)
*E03D 5/10* (2006.01)
*E03D 3/12* (2006.01)
*E03D 11/18* (2006.01)
*E03D 9/16* (2006.01)
*E03D 1/02* (2006.01)
E03D 1/30 (2006.01)

(52) U.S. Cl.
CPC .............. *E03D 1/142* (2013.01); *E03D 1/02* (2013.01); *E03D 3/12* (2013.01); *E03D 5/10* (2013.01); *E03D 9/16* (2013.01); *E03D 11/18* (2013.01); *E03D 1/308* (2013.01); *Y02A 20/412* (2018.01)

(58) Field of Classification Search
CPC .......... E03D 1/142; E03D 1/141; E03D 1/308
USPC .......................................................... 4/421
See application file for complete search history.

(56) References Cited

U.S. PATENT DOCUMENTS

| 5,720,053 A | 2/1998 | Menge |
| 6,195,810 B1 * | 3/2001 | Minamiyama .......... E03D 11/00 4/329 |
| 6,199,221 B1 * | 3/2001 | Stahlhut .................. E03D 1/142 4/390 |

(Continued)

FOREIGN PATENT DOCUMENTS

WO 2015036767 A1 3/2015

*Primary Examiner* — Huyen D Le
(74) *Attorney, Agent, or Firm* — Nexsen Pruet, LLC; Todd A. Serbin

(57) ABSTRACT

A volume controllable toilet flush system, comprising: a cistern configured to hold and retain a fluid; a vertically moveable siphon assembly comprising a siphon portion, a pipe and at least one resilient element attached to the pipe; a toilet bowl shaped to retain and hold waste; an actuator operatively connected to the pipe by a stud attached to the pipe and configured to provide vertical movement to the siphon assembly, wherein movement of the siphon assembly by the actuator stores or releases energy in the at least one resilient element and, wherein downward vertical movement of the siphon assembly puts the toilet bowl in fluid communication with the cistern by creating a siphoning action between the siphon portion and the fluid in the cistern and wherein subsequent upward vertical movement of the siphon assembly terminates the siphoning action to stop fluid flow from the cistern to the toilet bowl.

20 Claims, 7 Drawing Sheets

(56) References Cited

U.S. PATENT DOCUMENTS

| | | | |
|---|---|---|---|
| 9,145,668 B2* | 9/2015 | Molina | E03D 11/13 |
| 9,631,350 B2 | 4/2017 | Bekki et al. | |
| 10,036,152 B2* | 7/2018 | Guha | E03D 1/142 |
| 2005/0283895 A1* | 12/2005 | Tilson | E03D 1/142 |
| | | | 4/378 |
| 2007/0094783 A1* | 5/2007 | Wen | E03D 5/012 |
| | | | 4/421 |
| 2010/0175177 A1* | 7/2010 | Lee | E03D 5/012 |
| | | | 4/421 |
| 2011/0167550 A1 | 7/2011 | Revelle | |
| 2016/0312457 A1 | 10/2016 | Matsunaga | |
| 2017/0121954 A1 | 5/2017 | Chang | |

\* cited by examiner

VOLUME CONTROLLABLE TOILET FLUSH SYSTEMS AND METHODS OF USE

RELATED APPLICATION/S

This application claims the benefit of priority under 35 U.S.C. § 119(e) of U.S. Provisional Patent Application No. 62/377,937 filed Aug. 22, 2016 and claims priority under 35 U.S.C. § 120 as a divisional application of U.S. patent application Ser. No. 15/682,749 filed Aug. 22, 2017, the contents of which are incorporated herein by reference in their entireties.

FIELD AND BACKGROUND OF THE INVENTION

The present invention, in some embodiments thereof, relates to plumbing fixtures and, more particularly, but not exclusively, to systems and methods for controlling operation of a plumbing fixture.

Various attempts have been made to solve problems with conventional plumbing fixtures, including U.S. Pat. No. 9,631,350, U.S. Pat. No. 5,720,053, U.S. App. Pub. No. 2017/0121954, U.S. App. Pub. No. 2016/0312457, U.S. App. Pub. No. 2011/0167550 and WO 2015/036767, however, all are insufficient for various reasons.

SUMMARY OF THE INVENTION

There is provided in accordance with an exemplary embodiment of the invention, a volume controllable toilet flush system, comprising: a cistern configured to hold and retain a fluid; a vertically moveable siphon assembly comprising a siphon portion, a pipe and at least one resilient element attached to the pipe; a toilet bowl shaped to retain and hold waste; an actuator operatively connected to the pipe by a stud attached to the pipe and configured to provide vertical movement to the siphon assembly and to initiate evacuation of the toilet bowl regardless of fluid flow from the cistern, wherein movement of the siphon assembly by the actuator stores or releases energy in the at least one resilient element and, wherein downward vertical movement of the siphon assembly puts the toilet bowl in fluid communication with the cistern by creating a siphoning action between the siphon portion and the fluid in the cistern and wherein subsequent upward vertical movement of the siphon assembly terminates the siphoning action to stop fluid flow from the cistern to the toilet bowl.

In an embodiment of the invention, the at least one resilient element is attached to an upper end of the pipe downstream of the siphon portion.

In an embodiment of the invention, the system further comprises a second resilient element attached at one end to a lower end of the pipe and at the other end attached to the toilet bowl.

In an embodiment of the invention, the at least one resilient element is a bellows-shaped, resilient structure.

In an embodiment of the invention, the at least one resilient element is a spring or an elastic band.

In an embodiment of the invention, the system further comprises a rotating water trap downstream of the toilet bowl, wherein the water trap is configured with at least one rotary seal with petals or flaps arranged for reversibly rotating the water trap from a vertical to a horizontal configuration.

In an embodiment of the invention, the water trap is provided with an axis rod around which the water trap rotates.

In an embodiment of the invention, the system further comprises a gravity assist rotator assembly attached to the axis rod and configured with at least one weight positioned on the end of a rigid rod of some length.

In an embodiment of the invention, the gravity assist rotator assembly further comprises a lever rod connected to the axis rod on the opposite side of the water trap from the rigid rod.

In an embodiment of the invention, the system further comprises a linkage connected at an upper end to the actuator and having on the lower end two prongs, one prong on either side of the lever rod, wherein downward movement of the linkage motivates the water trap to rotate to a horizontal configuration from a vertical configuration and subsequent upward movement of the linkage motivates the water trap to rotate back to the vertical configuration.

In an embodiment of the invention, the cistern, the siphon assembly, and the toilet bowl are connected in water-tight, fluid communication.

In an embodiment of the invention, the siphon assembly is enclosed at least partially by a cover extending from the cistern to the toilet bowl.

In an embodiment of the invention, the cistern is vertically separated from and above the toilet bowl.

In an embodiment of the invention, gravity evacuates the toilet bowl through the water trap when the water trap is in the horizontal configuration.

In an embodiment of the invention, gravity causes fluid flow from the cistern to the toilet bowl.

In an embodiment of the invention, a quantity of fluid flow from the cistern upon activation matches the fluidic volume of the water trap.

There is further provided in accordance with an aspect of the invention, a method of using a volume controllable toilet flush system, comprising: filling a cistern with a fluid; initiating the system by moving the actuator downwards; moving a siphon assembly, comprising a siphon portion, a pipe and at least one resilient element attached to the pipe, downwards a sufficient amount with the actuator to create a siphoning action between the siphon portion and the fluid in the cistern to cause flow of the fluid from the cistern to a toilet bowl through at least the siphon assembly; releasing the actuator to restore the actuator to its previous position and to terminate the siphoning action.

In an embodiment of the invention, the method further comprises storing energy in the at least one resilient element during downward movement of the siphon assembly or the actuator.

In an embodiment of the invention, the method further comprises releasing stored energy in the at least one resilient element after release of the actuator or during upward movement of the siphon assembly.

There is further provided in accordance with an aspect of the invention, a method of using a volume controllable toilet flush system, comprising: filling a cistern with a fluid; initiating the system by moving the actuator downwards; moving a siphon assembly, comprising a siphon portion, a pipe and at least one resilient element attached to the pipe, downwards a sufficient amount with the actuator to create a siphoning action between the siphon portion and the fluid in the cistern, using at least one of the siphoning and gravity to cause flow of the fluid from the cistern to a toilet bowl through at least the siphon assembly; rotating a water trap from a vertical configuration to a horizontal configuration to evacuate the toilet bowl, around an axis defined by an axis rod and without regard of the flow of the fluid from the cistern; and, releasing the actuator to restore the actuator to its previous position and to terminate the siphoning action and to return the water trap from the horizontal configuration to the vertical configuration.

In an embodiment of the invention, filling the cistern is with a fluid is with an amount of fluid sufficient to restore a water level of the water trap.

In an embodiment of the invention, the rotating is accomplished by the force of fluid flow against a rotary seal, configured to translate the force to rotational motion, attached to the water trap.

In an embodiment of the invention, the method further comprises assisting the rotating using a gravity assist rotator assembly including at least a weight attached to a rigid rod such that during rotation of the water trap the weight assists continued rotation once the weight has passed a vertical position over the axis rod.

In an embodiment of the invention, the method further comprises using a linkage connected at an upper end to the actuator and having two prongs on a lower end, one prong on either side of a lever rod connected to the axis rod, wherein downward movement of the linkage motivates the water trap to rotate to a horizontal configuration from a vertical configuration and subsequent upward movement of the linkage motivates the water trap to rotate back to the vertical configuration Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example, are not necessarily to scale, and are for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
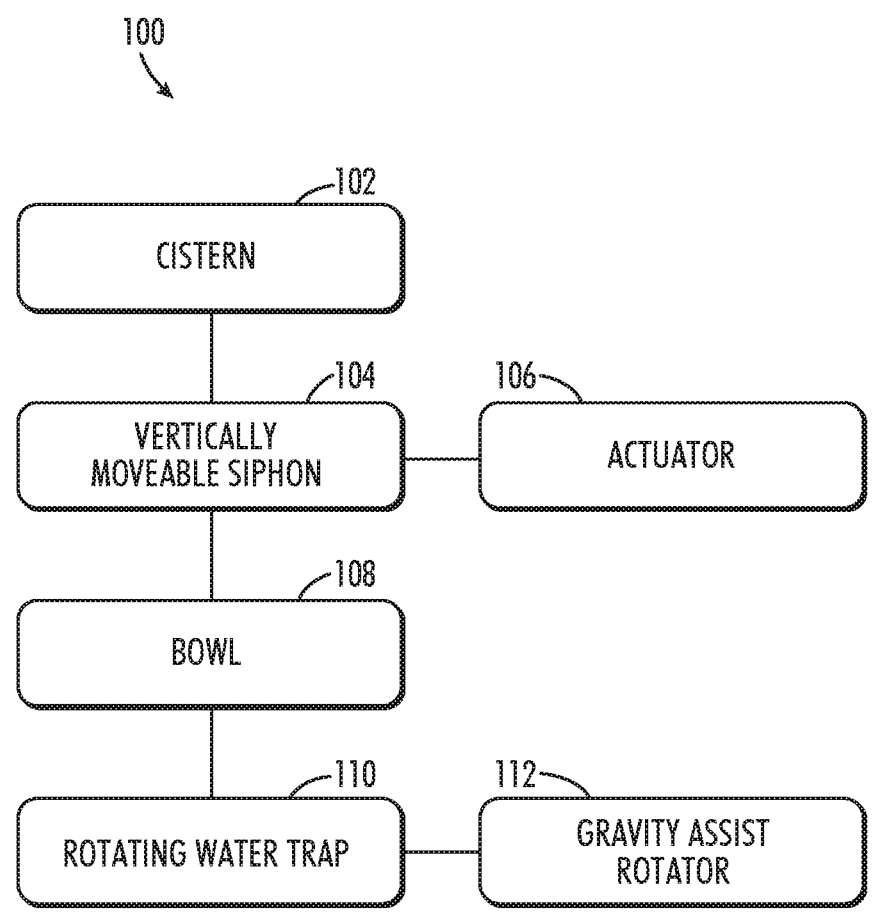
FIG. 1 is a block diagram of a volume controllable toilet flush system, in accordance with an exemplary embodiment of the invention.

The present invention, in some embodiments thereof, relates to plumbing fixtures and, more particularly, but not exclusively, to systems and methods for controlling operation of a plumbing fixture.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

There are many designs of toilet flush systems, yet there remains a need for a toilet flush system that would enable the user to control the flow volume during use and/or provide for a short-duration, but high flow rate, flush (particularly in low water pressure environments). Further, conventional toilets utilize rubber or plastic valve and/or seal components which tend to leak, particularly over time, so a design which eliminates this common source of failure is also desirable. An additional feature is achieved, in conjunction with the previously mentioned advantages, to provide a toilet flush system that conserves water in relation to conventional flush systems, both by providing short but powerful flushes and by reducing water-wasting leakage through eliminating conventional and non-durable valves and seals. In some aspects, waste disposal from a toilet bowl is also enhanced as a consequence of the structural design utilized to achieve the above-mentioned advantages/features.

In some aspects of the invention, the toilet flush system designs described herein are ergonomic and/or are low-impact/convenient for a user.

Referring now to the drawings, FIG. 1 is a block diagram of a volume controllable toilet flush system 100 for use with a toilet, in accordance with an exemplary embodiment of the invention. Generally, a toilet flush system 100 is described having a cistern 102, for holding and/or retaining liquid, configured to be in selective, fluidic communication with a siphon 104, configured to be vertically movable (at least one example of which is described below) with a spring-like and/or resilient/elastic element facilitating the movement action. In an embodiment of the invention, vertical movement of the siphon 104 is controlled by an actuator 106, which is connected to the siphon 104, physically, mechanically, electronically or otherwise to effectuate vertical movement of the siphon 104. It should be understood that vertical movement means downward and/or upward movement of the siphon 104. In an embodiment of the invention, the system 100 is provided with a toilet bowl 108, which is adapted to be in fluidic communication from the cistern 102, via the siphon 104, and/or to receive and/or hold waste from a user of the toilet until the toilet is flushed.

Figure 3A:
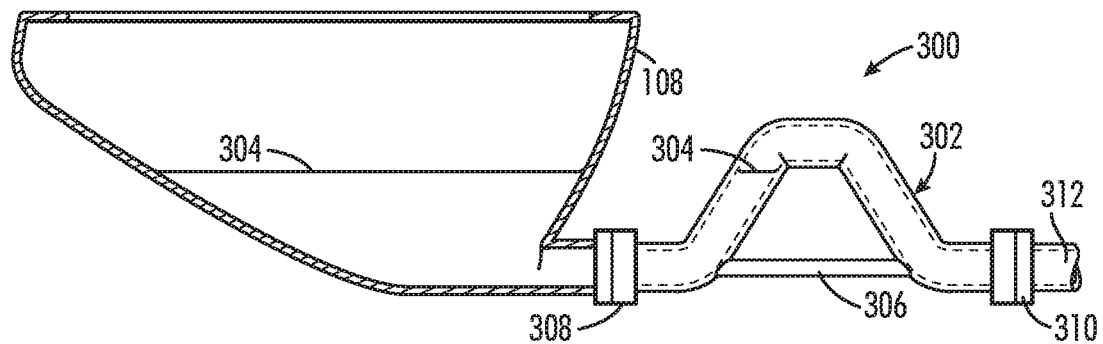
FIGS. 3A and 3B are cross-sectional, side views of a rotating water trap assembly of a volume controllable toilet flush system, in accordance with an exemplary embodiment of the invention.
Figure 3B:
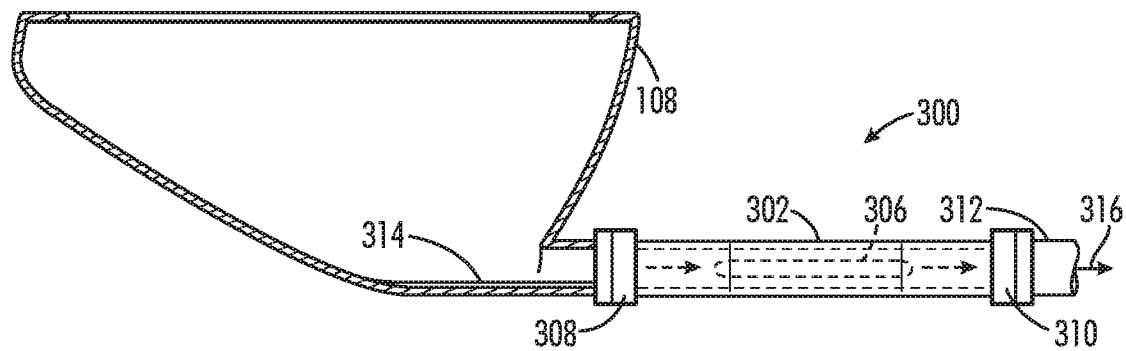
Figure 4A:
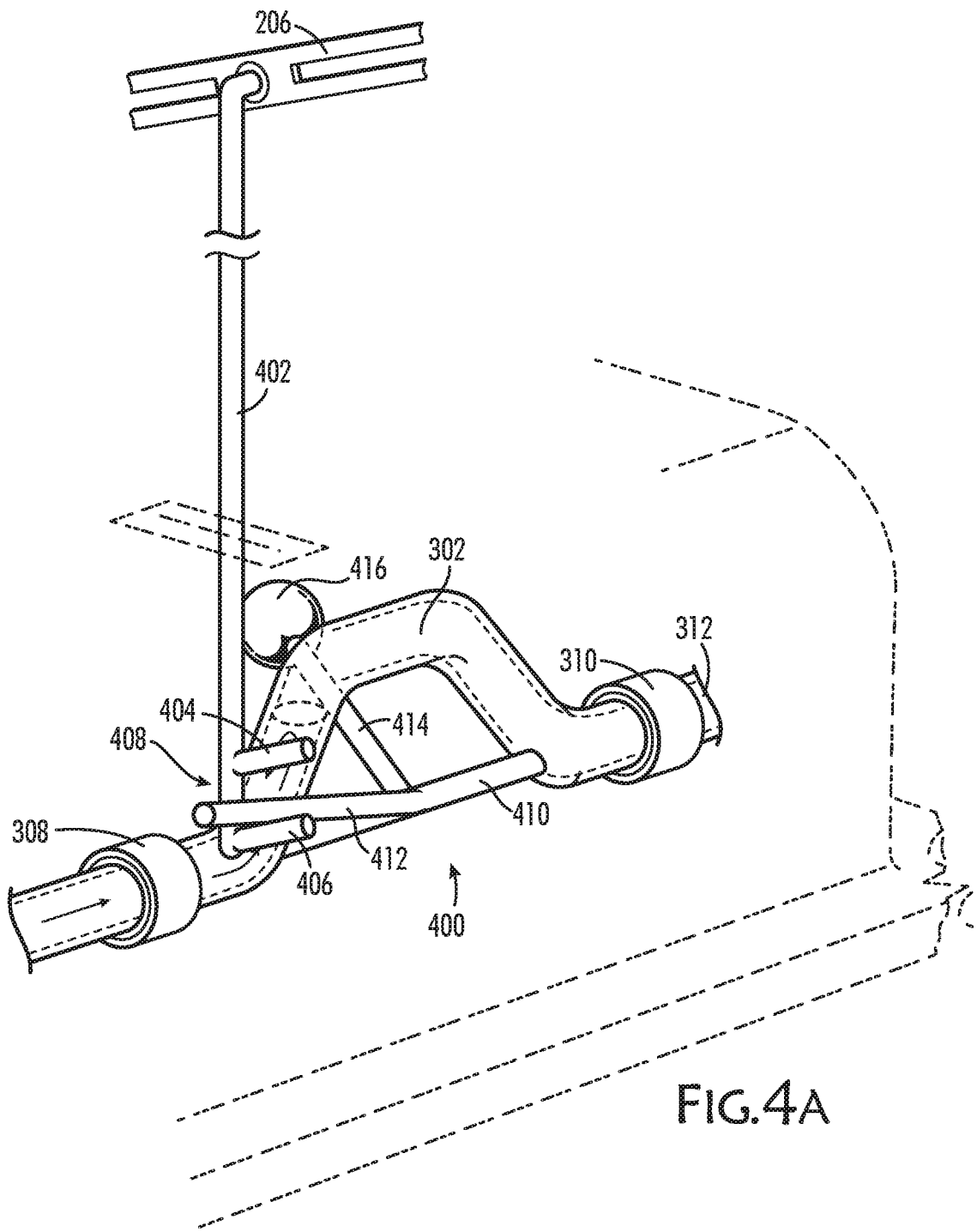
FIGS. 4A-4B are progressive, perspective views of a volume controllable toilet flush system with a rotating water trap and a gravity assist rotator assembly in operation, in accordance with an exemplary embodiment of the invention.
Figure 4B:
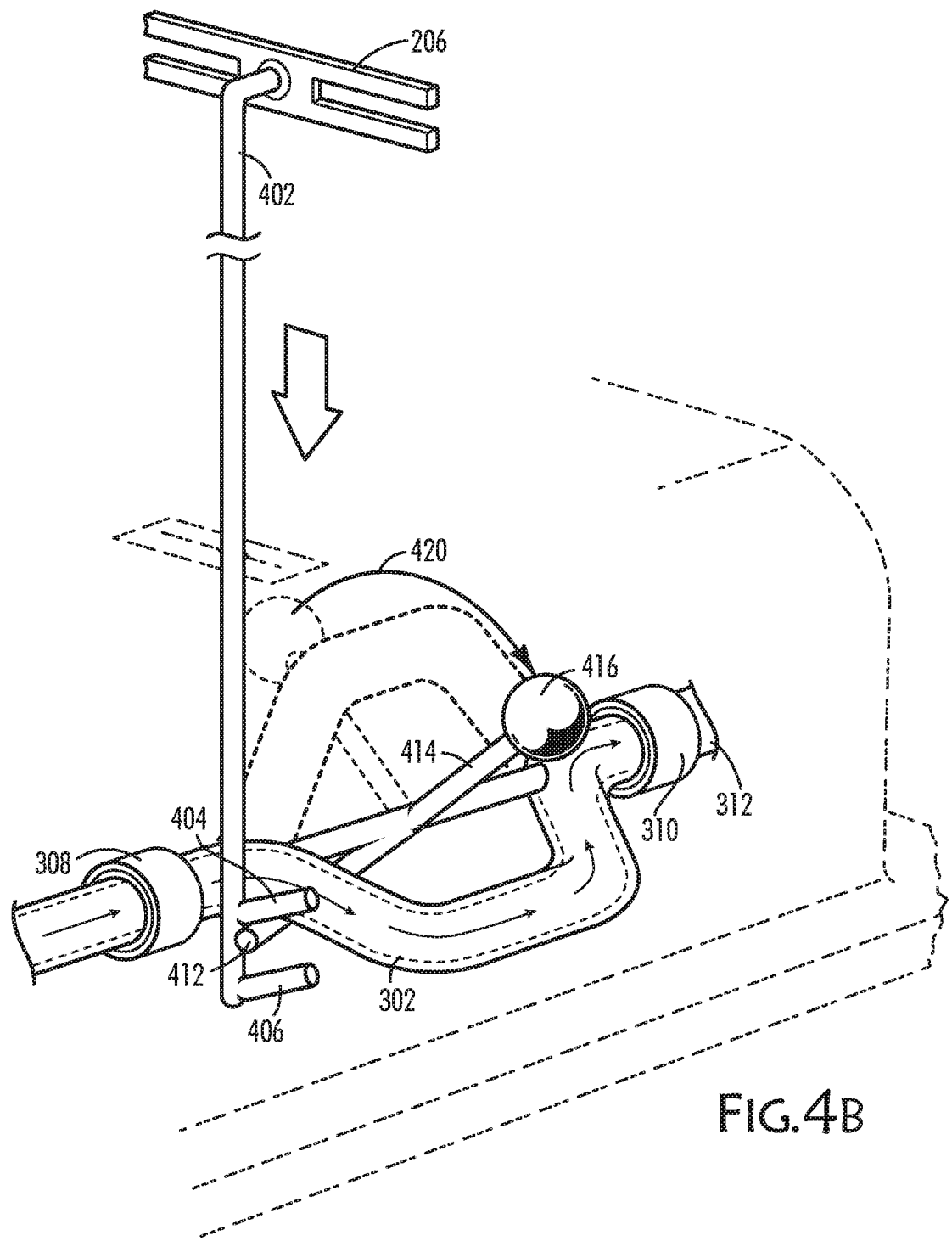

A water trap 110 configured for rotation during flushing, shown and described in more detail with respect to FIGS. 3A-3B, is optionally used with system 100 to reduce the usage of water needed per flush to be effective and/or to reduce obstructions downstream from the bowl 108. Additionally and/or optionally, a gravity assist rotator, shown and described in more detail with respect to FIGS. 4A-4B, is added to the rotating water trap 110 to assist with the rotation and/or counter-rotation of the water trap 110 during operation.

Figure 2:
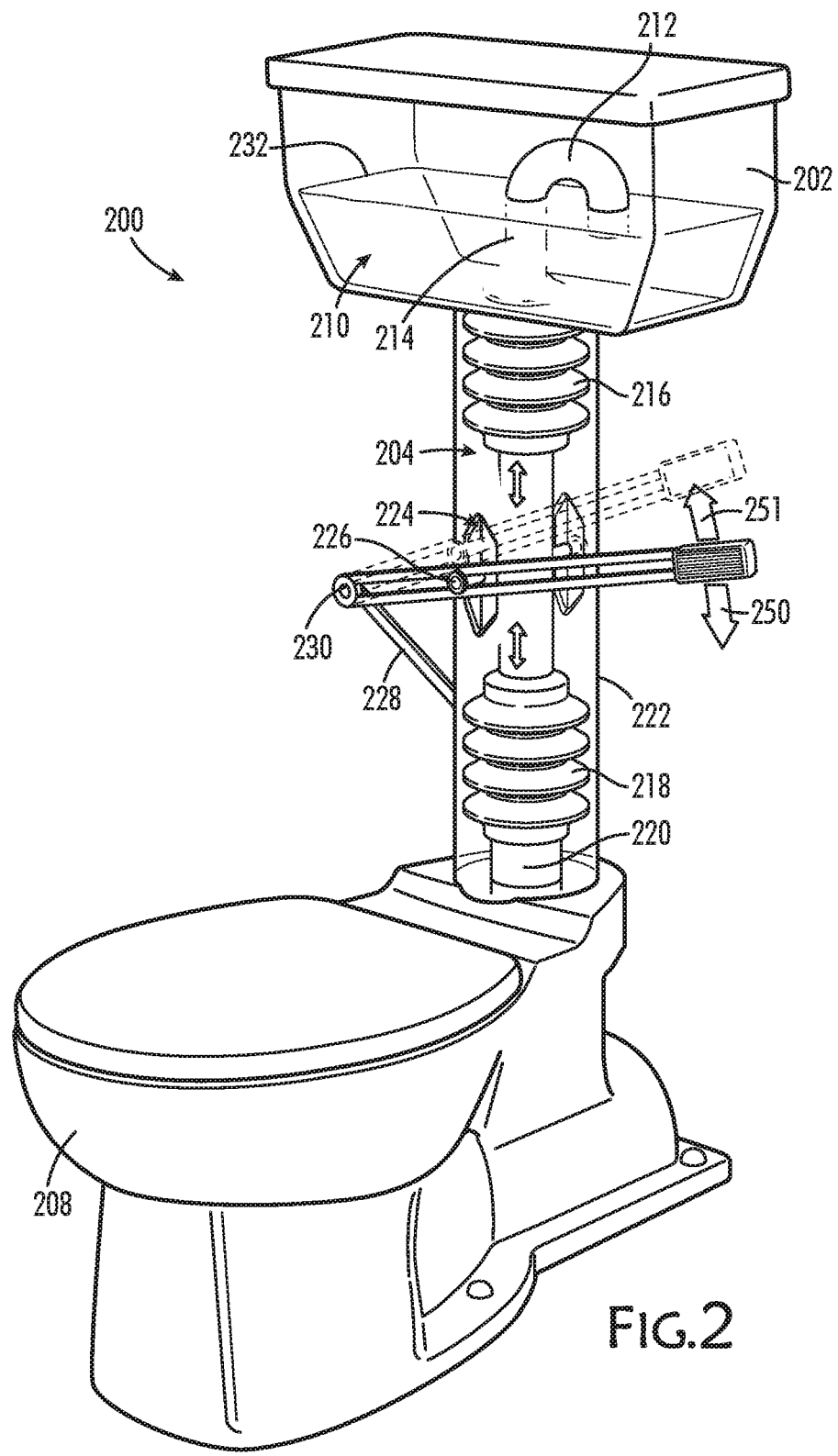
FIG. 2 is a perspective, partial cut-away view of a volume controllable toilet flush system, in accordance with an exemplary embodiment of the invention.

FIG. 2 is a perspective, partial cut-away view of a volume controllable toilet flush system 200, in accordance with an exemplary embodiment of the invention. In an embodiment of the invention, the cistern 202 is placed high up, optionally as high as clear space up to the ceiling permits. In some embodiments of the invention, the cistern 202 is mounted at least 4 feet above the floor. Optionally, the cistern 202 is mounted 6 feet or more above the floor. It is conceived that by increasing the height of the fluid 210 inside the cistern 202, a higher water velocity during flushing can be achieved, in relation to mounting the cistern 202 at a lower height.

In an embodiment of the invention, a siphon assembly 204 is used for transporting the fluid 210 from the cistern 202 to the toilet bowl 208. In some embodiments of the invention, the siphon assembly 204 includes a siphon portion 212, optionally U-shaped, in fluidic communication with a pipe 214. Optionally, the siphon portion 212 is merely a curved section of the pipe 214. In an embodiment of the invention, the pipe 214 is rigid. In an embodiment, an upper end the rigid pipe 214 passes through and/or is enclosed by a bellows-shaped (or accordion-like) structure 216 configured to produce a springy characteristic. In an embodiment of the invention, the bellows-shaped structure 216 is made of a resilient metal, rubber and/or polymer material. Additionally, alternatively and/or optionally, a different springy component is used, for example a coil spring and/or an elastic band or strap or the like. The bellows-shaped structure 216 is placed within the system 200 such that at rest, the bellows-shaped structure 216 is not under tension and/or is not retaining any significant energy, however upon the application of movement on the siphon assembly 204 (in this case in a downward direction 250) by an actuator 206, the bellows-shaped structure 216 will stretch, absorbing energy which will be released when the downward movement is halted and the actuator is freed by the user or is moved in the upward direction 251.

In an embodiment of the invention, the siphon assembly 204 also includes at least a second bellows-shaped structure 218 (and/or second springy component). FIG. 2 shows an alternative configuration for using a bellows-shaped structure in the system 100, wherein a single, continuous pipe does not transit through the second bellows-shaped structure 218, but rather the pipe 214 attaches to an upper end of the bellows-shaped structure 218, which is open on the inside, and then a second pipe 220 attaches to the bottom end of the second bellows-shaped structure 218 and eventually, the toilet bowl 208. In this configuration, movement of the siphon assembly 204 downwards causes energy to be stored in the bellows-shaped structure 218 by compressing it (or stretches, for example, a spring) to be released when the actuator 206 is released or moved upwards. It should be understood that all components from the cistern to the toilet boil 208, and further downstream, are configured to interface and/or be sealed in a water-tight manner, for example the junction between the second pipe 220 is sealed to toilet bowl 208 using a water-proof cement or similar material.

In an embodiment of the invention, the siphon assembly 204 and the related components are encased in a tube or pipe or cover 222. The bellows-shaped structure 216 and the second bellows-shaped structure 218 slide within the cover 222 during use, in an embodiment of the invention.

The pipe 214 is provided with a slot 224, or opening, on the front and/or back of the cover 222, wherein the slot 224 passes from the exterior of the cover 222 through to the interior of the cover 222 where the components of the siphon assembly 204 are located. In an embodiment of the invention, a stud 226 is firmly fixed to the pipe 214 and protrudes out of the slot 224 and through an elongate gap in the actuator 206 to secure the actuator 206 in a slidable relationship to the stud 226. In FIG. 2, slot 224 is shown on the front of the cover 222, it should be understood that alternatively or additionally, a slot is provided on the back of the cover 222 with a corresponding stud projected outwardly therefrom and attached to the pipe 214.

In an embodiment of the invention, an inclined lever support bar 228 is fixed to the cover 222 at a lower end of the lever support bar 228. At the upper end of the lever support bar 228, there is a joint or hinge 230 which connects to the actuator 206. In an embodiment of the invention, the actuator is a lever arm, such as shown in FIG. 2. In an embodiment of the invention, rotational movement by the actuator 206 about the joint 230 is enabled.

In an embodiment of the invention, the actuator 206 is located on the cover 222 at an ergonomic or comfortable height for a majority of intended users. Optionally, the actuator 206 is located at a height specifically designed for children, for example being no higher than 4 feet above the floor. Optionally, more than one actuator 206 is attached to the siphon assembly 204, but at different heights off the floor, and can be used equally to initiate the system 200.

Figure 5:
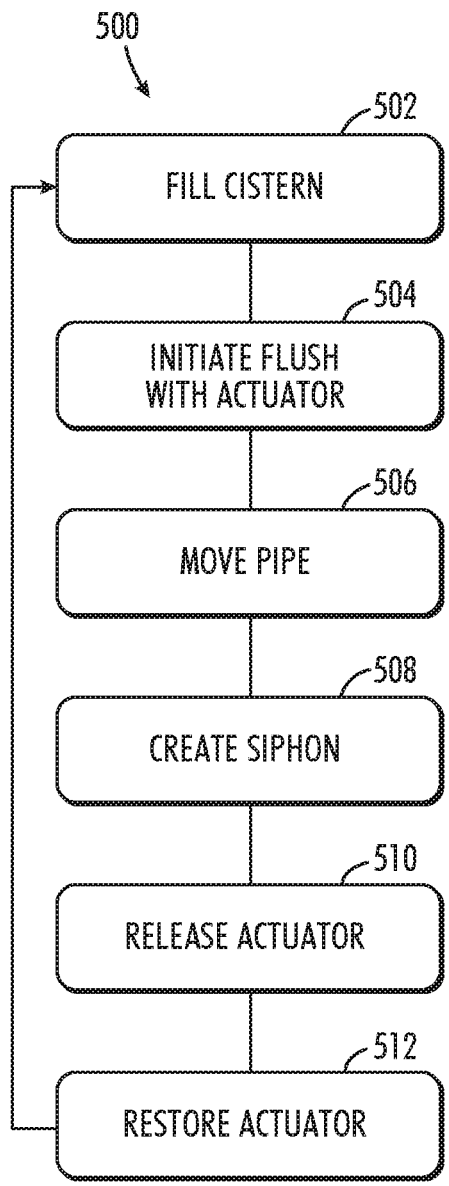
FIG. 5 is a flowchart of a method of using a volume controllable toilet flush system of FIG. 2, in accordance with an exemplary embodiment of the invention; and, FIG. 6 is a flowchart of a method of using a volume controllable toilet flush system of FIGS. 5A-5B, in accordance with an exemplary embodiment of the invention.

FIG. 5 is a flowchart of a method 500 of using a volume controllable toilet flush system 200 of FIG. 2, in accordance with an exemplary embodiment of the invention. In operation, the cistern 202 is filled (502) up to level 232 with a fluid, for example water from a consistent water supply, like a city water system. In order to initiate (504) a toilet flush, the toilet user pulls down on the actuator 206 at the free end (the end not attached to the support bar 228 at the joint 230). Movement of the actuator 206 is translated to the stud 226 and the pipe 214 is moved (506) in the downward direction 250. In an embodiment of the invention, bellows-shaped structure 216 distends and second bellows-shaped structure 218 compresses, storing energy, as the pipe 214 is moved in the downwards direction 250.

Movement (506) of the pipe 214 also results in movement of the siphon portion 212 downwards and into the fluid 210 in the cistern 202. When the top of the inverted, U-shaped siphon meets fluid level 232, siphon action is created (508) automatically and the fluid 210 begins to flow into the siphon portion 212 and into the pipe 214. Because the toilet bowl 208 is in fluidic communication with the cistern 202 when the flushing system 200 is activated, the flow of the fluid 210 passes from the pipe 214, into the second bellows-shaped structure 218, into the second pipe 220 and then into the toilet bowl 208, causing a flushing of the contents of the toilet bowl 208 and moving contents therein out of the toilet bowl 208 and downstream into the sewer or septic system.

At any stage of the fluid 210 outflow from the cistern 202, the user may release (510) the actuator 206. The stored energy of the bellows-shaped structures (effectuating a spring-like force) restores (512) the actuator 206 and the pipe 214 to their positions prior to initiation (504). As the siphon portion 212 moves upwards and out of the fluid 210 (above level 232) the siphon action stops and the fluid flow subsequently stops. The cistern 202 is optionally (re)filled (502) from a fluid supply after the flushing, such as the city water system.

In this manner, the user can control the net water volume outflow. If a small volume outflow is required for flushing (for example, to flush urine or a small amount of waste in the toilet bowl 208), then the actuator 206 is held down for a short time. If large outflow is required (for example, to flush a large quantity of waste), the actuator 206 is held down for a longer period. A particular advantage of this selective flow system is that the user can visually inspect the status of waste disposal from the toilet bowl 208 and can choose to hold the actuator 206 for as long as is necessary to remove the waste. In an embodiment of the invention, there is also a setting which sustains the flow until the cistern 202 is fully drained and/or wherein the actuator 206 is automatically released, to return to its initial position, when the cistern 202 is fully drained.

FIGS. 3A and 3B are cross-sectional, side views of a rotating water trap assembly 300 of a volume controllable toilet flush system, in accordance with an exemplary embodiment of the invention. It should be understood that the rotating water trap assembly 300 is optionally used with the volume controllable toilet flush systems 100, 200 described herein to achieve enhanced fluid/water-savings and/or system 100, 200 efficacy for waste removal.

FIG. 3A shows a rotating water trap 302 that is in the shape of an inverted U, in an embodiment of the invention. Fluid is retained in the toilet bowl 108 at a "high" level 304 during non-use because outflow of the fluid in the toilet bowl 108 is held in check by the water trap 302, where the height of the inverse U-shape of the trap 302 sets the maximum pre-determined level 304 in the toilet bowl 108. In an embodiment of the invention, the water trap 302 is rotated about an axis defined by axis rod 306 to lower the height of the trap 302 to be essentially horizontal and well below the high level 304, as shown in FIG. 3B. The reduction in effective height of the trap 302 enables the outflow 316 of fluid and waste from the toilet bowl with only a minimal inflow of fluid into the toilet bowl 108 from the cistern 102.

In an embodiment of the invention, at one end of the water trap 302 there is a sliding rotary seal 308 in fluid communication with the toilet bowl 108 and between the toilet bowl 108 and the water trap 302. At the other end of the water trap 302 there is a second rotary seal 310 in fluid communication with a discharge pipe 312. When the water trap 302 is rotated into the horizontal position shown in FIG. 3B, the high level 304 falls to a lower level 314, an example of which is shown in FIG. 3B.

In some embodiments of the invention, water flow into the toilet bowl 108 effectuates flow into the first rotary seal 308, where the force of the water flow causes rotation of the water trap 302 to the configuration shown in FIG. 3B. Optionally, the rotary seals 308, 310 are provided with petals or flaps configured to transfer the force of the water flow into rotational movement resulting in the rotation of the water trap 302. In some embodiments of the invention, the rotary seals 308, 310 are biased such that when flow stops or is lowered to a certain threshold, the water trap 302 returns to the vertical position shown in FIG. 3A.

FIGS. 4A-4B are progressive, perspective views of a volume controllable toilet flush system in operation with a rotating water trap 302 and a gravity assist rotator assembly 400, in accordance with an exemplary embodiment of the invention. In an embodiment of the invention, a linkage 402 is swivel-fixed to at an upper end of the linkage 402 to the actuator 206. The linkage 402 is provided with two prongs 404, 406 located on a lower end 408 (opposite the upper end) of the linkage 402 positioned above and below a lever rod 412 which is affixed to an axis rod 410 placed between two segments of the water trap 302. The axis rod 410 forms an axis of rotation for the water trap 302. A rigid rod 414 is affixed to the axis rod 410 on the other side of the water trap 302 from the lever rod 412. In some embodiments of the invention, there is approximately a 90-degree angle between the lever rod 412 and the rigid rod 414. In some embodiments of the invention, the lever rod 412 extends outwardly at an oblique angle to the axis rod 410. A weight 416 is positioned at the free end of the rigid rod 414, in an embodiment of the invention.

It should be understood that the rotating water trap 302 and the gravity assist rotator assembly 400 are, each, optionally usable with the volume controllable flushing system 200 described in FIG. 2.

Figure 6:
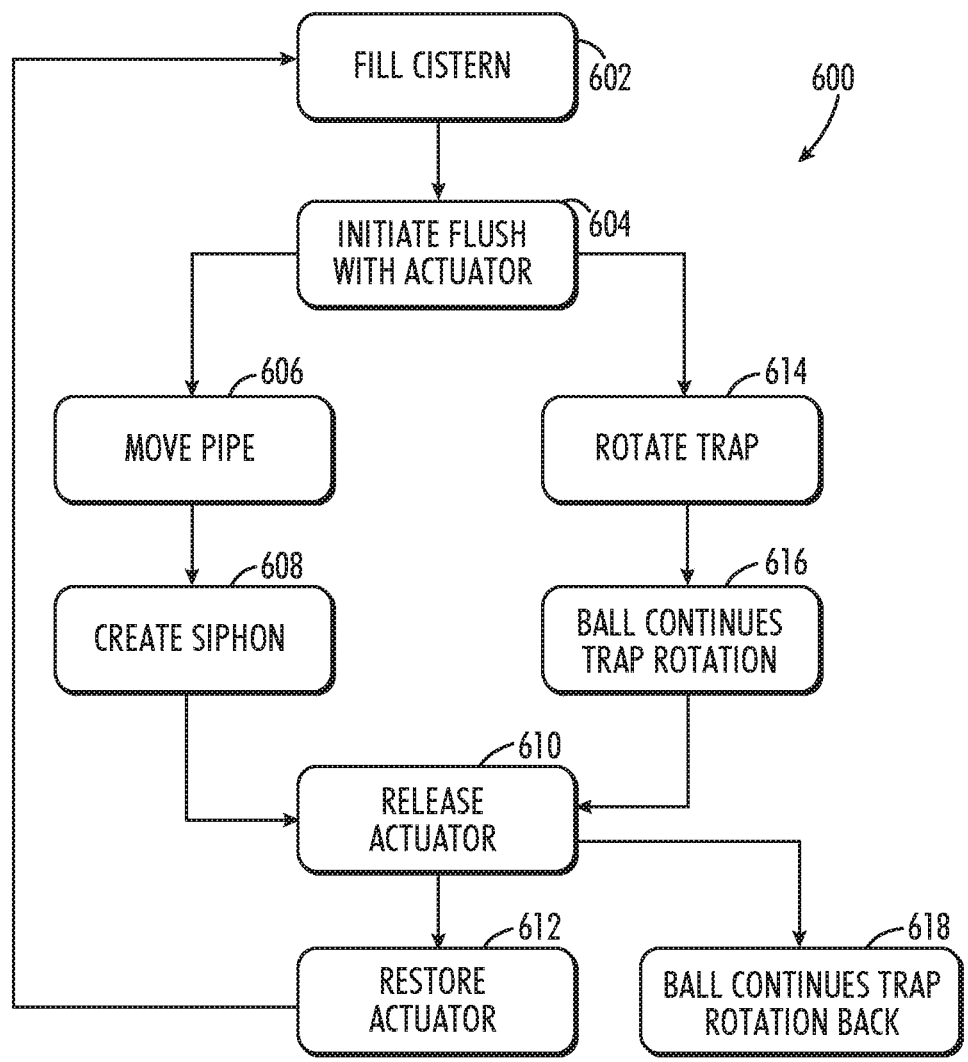

FIG. 6 is a flowchart of a method 600 of using a volume controllable toilet flush system of FIGS. 4A-4B, in accordance with an exemplary embodiment of the invention. For efficiency, the method 600 of using a system with the gravity assist rotator assembly 400 is described in conjunction with the structures shown and described with respect to FIGS. 2 and 3A-3B, however, it should be understood that the structural configuration of system 200 does not necessarily have to be used. In operation, the cistern 202 is filled (602) up to level 232 with a fluid, for example water from a consistent water supply, like a city water system. In order to initiate (604) a toilet flush, the toilet user pulls down on the actuator 206 at the free end (the end not attached to the support bar 228 at the joint 230). Movement of the actuator 206 is translated to the stud 226 and the pipe 214 is moved (606) in the downward direction 250.

In an embodiment of the invention, bellows-shaped structure 216 distends and second bellows-shaped structure 218 compresses, storing energy, as the pipe 214 is moved in the downwards direction 250. In some embodiments of the invention, initiating (604) the toilet flush causes the linkage 402 to move downwards, causing the prong 404 to come into contact with the lever rod 412. Sustained downward movement of the actuator 206 causes continued movement of the lever rod 412, thereby rotating 420 the axis rod 410 and the water trap 302. In an embodiment of the invention, the weight 416 also moves during rotation 420 of the water trap 302, such that after crossing the neutral position (where the weight is vertical), gravitational force on the weight 416 causes and/or assists (616) with movement of the water trap 302 to the horizontal position (such as shown in FIG. 4B).

Movement (606) of the pipe 214 also results in movement of the siphon portion 212 downwards and into the fluid 210 in the cistern 202. When the top of the inverted, U-shaped siphon meets fluid level 232, siphon action is created (608) automatically and the fluid 210 begins to flow into the siphon portion 212 and into the pipe 214. Because the toilet bowl 208 is in fluidic communication with the cistern 202 when the flushing system 200 is activated, the flow of the fluid 210 passes from the pipe 214, into the second bellows-shaped structure 218, into the second pipe 220 and then into the toilet bowl 208, causing a flushing of the contents of the toilet bowl 208 and moving contents therein out of the toilet bowl 208 and downstream into the sewer or septic system.

At any stage of the fluid 210 outflow from the cistern 202, the user may release (610) the actuator 206. The stored energy of the bellows-shaped structures (effectuating a spring-like force) restores (612) the actuator 206 and the pipe 214 to their positions prior to initiation (604). As the siphon portion 212 moves upwards and out of the fluid 210 (above level 232) the siphon action stops and the fluid flow subsequently stops. The cistern 202 is optionally (re)filled (602) from a fluid supply after the flushing, such as the city water system.

In an embodiment of the invention, when the actuator is released (610) and the linkage 402 moves back upwards, prong 406 comes into contact with the lever rod 412 causing and/or assisting with rotation of the water trap 302 back to the configuration shown in FIG. 4A. As during forward rotation 420, backward rotational motion of the weight 416 causes and/or assists (618) with the restoration of the configuration shown in FIG. 4A once the weight 416 passes the vertical.

A small amount of fluid flowing into the toilet bowl 108 flows into the water trap 302, once restored to vertical, re-establishing the water trap and an operational fluid level in the toilet bowl 108.

The above described embodiments provide a number of advantages, many of which operate in conjunction with each other to provide an enhanced benefit. The water delivery volume of the systems described herein is variable. The user need not preselect the delivery volume. During the flushing operation, upon visual observation of the progress of the flushing operation the flow can be terminated simply by releasing the actuator. If required, a second, subsequent flushing can be done after the first flushing with the residual water in the cistern and without refilling. The entire operation is under full control of the user at all times.

In some embodiments of the invention, no valves are used. That is, there are no rubber, plastic or metal valves that degrade, deform, or become ineffective because of deposits of salts or other minerals from the wash water or from cleaning chemicals. Thus, leakage from the cistern in between use is minimized or eliminated.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A volume controllable toilet flush system, comprising:
   a cistern configured to hold and retain a fluid;
   a vertically moveable siphon assembly comprising a siphon portion, a pipe and at least one resilient element attached to the pipe;
   a toilet bowl shaped to retain and hold waste;
   an actuator operatively connected to the pipe by a stud attached to the pipe and configured to provide vertical movement to the siphon assembly and to initiate evacuation of the toilet bowl with or without fluid flow from the cistern,
   wherein movement of the siphon assembly by the actuator stores or releases energy in the at least one resilient element and, wherein downward vertical movement of the siphon assembly puts the toilet bowl in fluid communication with the cistern by creating a siphoning action between the siphon portion and the fluid in the cistern and wherein subsequent upward vertical movement of the siphon assembly terminates the siphoning action to stop fluid flow from the cistern to the toilet bowl.

2. A system according to claim 1, wherein the at least one resilient element is attached to an upper end of the pipe downstream of the siphon portion.

3. A system according to claim 2, further comprising a second resilient element attached at one end to a lower end of the pipe and at the other end attached to the toilet bowl.

4. A system according to claim 1, wherein the at least one resilient element is a bellows-shaped, resilient structure.

5. A system according to claim 1, wherein the at least one resilient element is a spring or an elastic band.

6. A system according to claim 1, further comprising a rotating water trap downstream of the toilet bowl, wherein the water trap is configured with at least one rotary seal with petals or flaps arranged for reversibly rotating the water trap from a vertical to a horizontal configuration.

7. A system according to claim 6, wherein the water trap is provided with an axis rod around which the water trap rotates.

8. A system according to claim 7, further comprising a gravity assist rotator assembly attached to the axis rod and configured with at least one weight positioned on the end of a rigid rod of some length.

9. A system according to claim 8, wherein the gravity assist rotator assembly further comprises a lever rod connected to the axis rod on the opposite side of the water trap from the rigid rod.

10. A system according to claim 9, further comprising a linkage connected at an upper end to the actuator and having on the lower end two prongs, one prong on either side of the lever rod, wherein downward movement of the linkage motivates the water trap to rotate to a horizontal configuration from a vertical configuration and subsequent upward movement of the linkage motivates the water trap to rotate back to the vertical configuration.

11. A system according to claim 6, wherein gravity evacuates the toilet bowl through the water trap when the water trap is in the horizontal configuration.

12. A system according to claim 1, wherein the cistern, the siphon assembly, and the toilet bowl are connected in water-tight, fluid communication.

13. A system according to claim 1, wherein the cistern is vertically separated from and above the toilet bowl.

14. A system according to claim 1, wherein gravity causes fluid flow from the cistern to the toilet bowl.

15. A system according to claim 1, wherein a quantity of fluid flow from the cistern upon activation matches the fluidic volume of the water trap.

16. A method of using a volume controllable toilet flush system, comprising:
filling a cistern with a fluid;
initiating the system by moving the actuator downwards;
moving a siphon assembly, comprising a siphon portion, a pipe and at least one resilient element attached to the pipe, downwards a sufficient amount with the actuator to create a siphoning action between the siphon portion and the fluid in the cistern, using at least one of the siphoning and gravity to cause flow of the fluid from the cistern to a toilet bowl through at least the siphon assembly;
rotating a water trap from a vertical configuration to a horizontal configuration to evacuate the toilet bowl, around an axis defined by an axis rod and without regard of the flow of the fluid from the cistern; and,
releasing the actuator to restore the actuator to its previous position and to terminate the siphoning action and to return the water trap from the horizontal configuration to the vertical configuration.

17. A method according to claim 16, wherein filling the cistern is with a fluid is with an amount of fluid sufficient to restore a water level of the water trap.

18. A method according to claim 16, wherein the rotating is accomplished by the force of fluid flow against a rotary seal, configured to translate the force to rotational motion, attached to the water trap.

19. A method according to claim 16, further comprising assisting the rotating using a gravity assist rotator assembly including at least a weight attached to a rigid rod such that during rotation of the water trap the weight assists continued rotation once the weight has passed a vertical position over the axis rod.

20. A method according to claim 19, further comprising using a linkage connected at an upper end to the actuator and having two prongs on a lower end, one prong on either side of a lever rod connected to the axis rod, wherein downward movement of the linkage motivates the water trap to rotate to a horizontal configuration from a vertical configuration and subsequent upward movement of the linkage motivates the water trap to rotate back to the vertical configuration.

* * * * *